ORIENTING APPARATUS

Original Filed May 28, 1971 4 Sheets-Sheet 1

John S. Evans, Jr.
Leslie L. Jasper
INVENTORS

BY Hyer, Eickenroht, Thompson & Turner
ATTORNEYS

ORIENTING APPARATUS

Original Filed May 28, 1971

John S. Evans, Jr.
Leslie L. Jasper
INVENTORS

BY Hyer, Eickenroht, Thompson & Turner
ATTORNEYS

John S. Evans, Jr.
Leslie L. Jasper
INVENTORS

BY Hyer, Eickenroht, Thompson + Turner
ATTORNEYS

John S. Evans Jr.
Leslie L. Jasper
INVENTORS

BY Hyer, Eickenroht, Thompson + Turner
ATTORNEYS

United States Patent

Re. 28,413
Reissued May 6, 1975

28,413
ORIENTING APPARATUS

John S. Evans, Jr., and Leslie L. Jasper, Houston, Tex., assignors to Mark Products, Inc., Houston, Tex.

Original No. 3,690,487, dated Sept. 12, 1972, Ser. No. 148,041, May 28, 1971. Application for reissue Dec. 4, 1972, Ser. No. 311,481
Int. Cl. B65g 7/00
U.S. Cl. 214—340 17 Claims

Matter enclosed in heavy brackets [ ] appears in the original patent but forms no part of this reissue specification; matter printed in italics indicates the additions made by reissue.

ABSTRACT OF THE DISCLOSURE

Apparatus is disclosed that uses a known structural discontinuity in the wall of an object to orient the object. The wall of the object is moved through a magnetic field. As the known discontinuity, such as the longitudinal seam of a can, moves through the field, the field is disturbed and distorted. A magnetic detector head is positioned so a current will be induced in the head by the change in the magnetic field caused by the discontinuity. The induced current is used to stop the moving object after a predetermined time period, which may be zero. Thus, a plurality of similar objects can be sequentially passed through the field and all will be oriented in the same relative position.

This invention relates to apparatus for positioning an object to have a given orientation relative to a given reference plane.

This invention can be used to orient any object having a known discontinuity that will disturb or distort a magnetic field sufficiently to induce or change a current in a magnetic detector head. The invention has found particular utility in the orientation of cans that have a longitudinal seam which provides the required known structural discontinuity for disturbing or distorting a magnetic field sufficiently to induce a current signal in a magnetic detector head.

Containers, such as cans, may need to be oriented to a given position before they are labeled. This allows the label to be placed on the can so that the ends of the label meet at a preselected place on the can. Frequently, this is done so that the ends of the label will overlap at the longitudinal seam in the wall of the can.

Marketing research has also indicated that it is advantageous to the sale of a product, where the product is packaged and sold in groups, such as six-packs of canned beer, dog food and the like, for the labels on the cans to be oriented so that the labels all face outwardly from the six-pack toward the purchaser. In the same way, it is desirable where the product is sold in cases of twenty-four cans, that the six cans on each side of the case are oriented so that the labels on the cans uniformly face outwardly toward the customer viewing the case.

It is an object of this invention to provide apparatus for orienting objects having a known structural discontinuity, such as a can having a longitudinal seam, so they are oriented consistently in a preselected position with respect to a given reference plane.

It is another object of this invention to provide orienting apparatus to orient cylindrical objects such as cans in a preselected position with respect to a given reference point or plane as they are moved along a conveyor system.

It is another object of this invention to provide orienting apparatus that employs the change caused in a magnetic field by a known structural discontinuity in the object to locate the object in the desired orientation.

It is another object of this invention to provide apparatus for orienting objects made of ferro-magnetic material and that have a known structural discontinuity that will disturb or distort a magnetic field as the discontinuity is moved through the field.

It is a further object of this invention to provide orienting apparatus for cans having a known discontinuity, such as a longitudinal seam, that will hold a can with a portion of the wall of the can in a magnetic field, rotate the can around its longitudinal axis, and stop the can when positioned in the desired orientation, as a result of a signal produced in a magnetic detector by the passing of the longitudinal seam of the can through the magnetic field.

These and other objects, advantages, and features of this invention will be apparent to those skilled in the art from a consideration of this specification, including the attached drawings and appended claims.

The invention will now be described in detail in connection with the attached drawings, in which.

Figure 1:
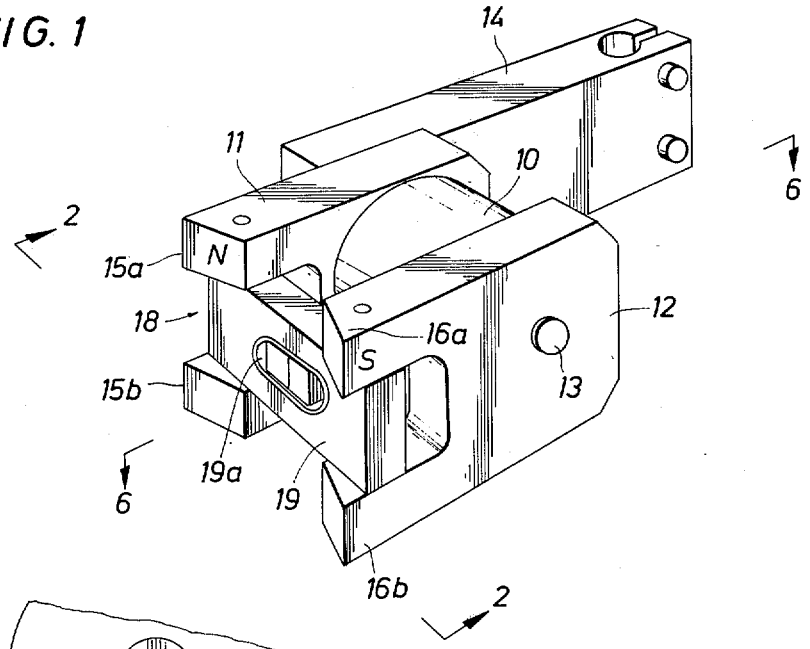
FIG. 1 is an isometric view of the preferred embodiment of the magnetic detector head and permanent magnet assembly of this invention that provides the signal used to control the brake that stops the moving object when oriented in a preselected position.

As explained above, this invention orients a member having a known structural discontinuity by moving the member through the magnetic field and by providing means that provide a signal when the magnetic field is changed or distorted by the structural discontinuity in the member. The signal then is used to orient the member in the desired position. By "known" discontinuity, it is meant some structural characteristic of the member that is present in all of the members to generally the same degree and in the same relative position. The discontinuity must be such as will produce a sufficient distortion or change in a magnetic field to produce the desired signal in the signal producing means. The invention is shown in the drawings embodied in apparatus for orienting cans having longitudinal seams, and the preferred embodiment of the invention will be described in connection with the use of this apparatus to orient such cans.

Figure 6:
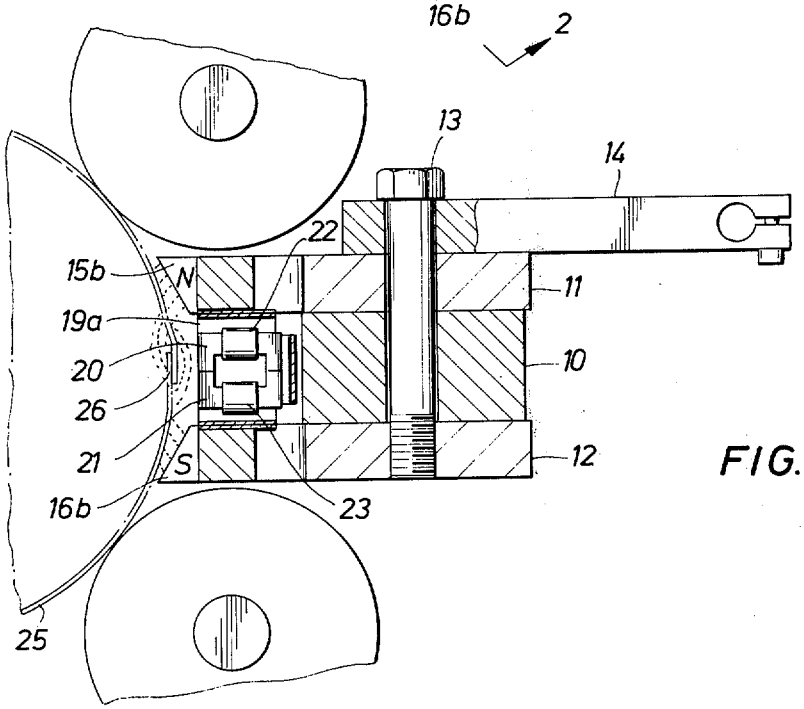
FIG. 6 is a view similar to FIG. 5, but on an enlarged scale, to show the flux pattern of the magnetic field and how it is disturbed by the passage of a seam in a can being oriented.

In FIG. 1, permanent magnet 10 supplies the magnetic field. Attached to the magnet at opposite ends are pole pieces 11 and 12. As shown in FIG. 6, the pole pieces are attached to the magnet by mounting bolt 13 that extends through the center of the magnet and engages a tapped hole in pole piece 12. Mounting bolt 13 also attaches the magnet and magnetic detector head assembly to mounting bracket 14.

Pole pieces 11 and 12 are U- or horseshoe-shaped at one end, as seen in FIG. 1. Thus, pole piece 11 has arms 15a and 15b that will be of a similar polarity as the end of magnet 10 to which the pole piece is attached. For example, arms 15a and 15b are shown as being connected to the north pole of magnet 10, and arms 16a and 16b of pole piece 12 are connected to the south pole of the magnet. With this arrangement then, a magnetic field is established between arms 15a and 16a and arms 15b and 16b.

Means are provided to produce a signal when the magnetic field is changed or distorted by a structural discontinuity in a member as the structural discontinuity moves through the magnetic field. In the embodiment shown, such means comprises magnetic detector head 18. The head includes mounting block 19 having elliptical opening 19a in which U-shaped members 20 and 21 are mounted. These members are made of a ferro-magnetic material and mounted, as shown in FIG. 6, to form a rectangular shaped path for magnetic flux to travel through. The members have windings 22 and 23 thereon that are connected in series and in which a current is induced when magnetic flux flows through members 20 and 21. This current or signal is then fed to an electric circuit to be described below that orients the member being oriented. As shown in FIG. 6, cylindrical can 25 has longitudinal seam 26. Two kinds of longitudinal seams are generally used in the manufacture of cans that have seams. One is the overlapped type shown in FIG. 6. Another is of the type where the two edges being connected together are dovetailed into each other. Either type of seam will distort a magnetic field through which it moves. The distortion or change results because there is a break in the continuity of the metal and the magnetic flux has to move from one side of the break to the other. This causes the flux to fringe outwardly or loop around the connection between the two edges of the metal and in doing so will induce a magnetic field to flow in ferromagnetic members 20 and 21 of the magnetic detector head. The flow of this flux induces a current in windings 22 and 23, which, as explained above, is used to orient the can. Probably there will be a flow of flux through members 20 and 21 at all times due to the fact that they are located between pole pieces 11 and 12. When the can is in the position shown in FIG. 6, the flux flowing between the pole pieces will tend to flow through the wall of the can, since it is the path of least resistance. At that time the flow of flux in members should be a minimum, but when the flux has to move outside the can to move around seam 26, then the flux in members 20 and 21 should be sharply increased. This will cause a relatively strong signal to be generated in coils 22 and 23 due to the change in flux with respect to time in members 22 and 23.

Preferably, members 20 and 21 are located between pole pieces 11 and 12 with the geometric center of the members equally spaced from the arms on the pole pieces. This locates the members in the area of where the flux traveling between the pole pieces is a minimum. The flux is a minimum at this location because the polarity of the flux traveling between arms 15a and 16a is the same at any point between the arms as the flux traveling between arms 15b and 16b. Therefore, the two fields will tend to repel each other, thereby reducing substantially the amount of flux traveling through the area where members 20 and 21 are located. To further protect the members from being influenced by flux from pole pieces 11 and 12, the members are shielded from the pole pieces by layer 28 of material that lines elliptical opening 19a. The material should have a high permeability to magnetic flux so that the flux will tend to travel around members 20 and 21 through this layer of material rather than through the members. One such metal that is satisfactory for this purpose is Mumetal.

Figure 2:
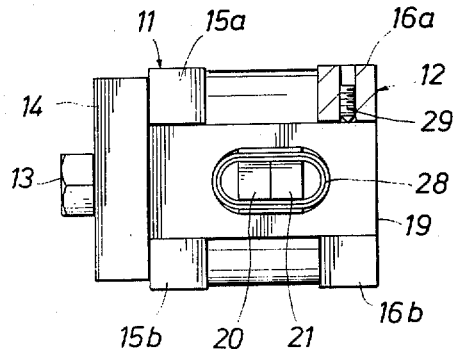
FIG. 2 is a front view of the assembly of FIG. 1.

Whatever flux from pole pieces 11 and 12 that passes through members 20 and 21 will be constant and, therefore, will not induce a current in coils 22 and 23, all things being equal. The cans, however, are not uniform and will be "out of round" to varying degrees. This causes the distance between the wall of the can and the members to vary as the can is rotated. Some of the flux in members 20 and 21 will be transferred to the can and the amount so transferred will vary with the distance from the can to the members. Therefore, out of round cans will tend to change the flux in the members and induce currents in coils 22 and 23. Thus, by keeping the flux in members 20 and 21 to a minimum, unwanted signals due to out of round cans, out of round rollers, etc. will be minimized. As shown in FIG. 2, magnetic detector head 18 is mounted between the arms provided by the U- or horseshoe-shaped ends of the pole pieces by setscrews, such as setscrew 29, in arm 16a of FIG. 2.

Figure 3:
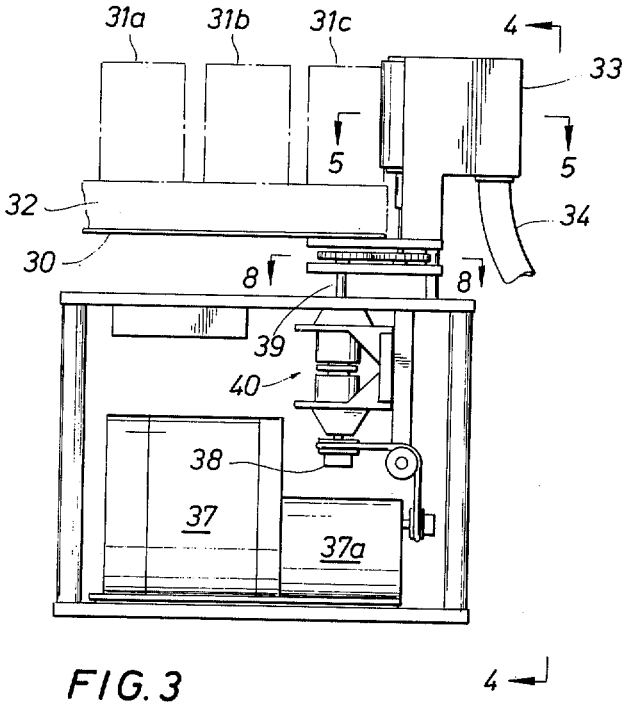
FIG. 3 is a side view of apparatus arranged to orient cans on a conveyor belt employing the assembly of FIG. 1.

As explained above, one of the features of this invention is to provide novel apparatus that can be used to orient cans as they move along a conveyor belt. Referring now to FIG. 3, apparatus is shown for orienting the cans along one side of a case of cans being moved along conveyor 30. Only the front three cans, 31a, 31b, and 31c, are shown, and there would be another one on the left-hand side in the conventional 24-can case. The cans are located in cardboard tray 32, and in one packaging arrangement wherein this invention is used, after the cans are oriented, they will be encased in a clear see-through, shrink-type covering that will enclose both the cans and the cardboard tray.

Figure 5:
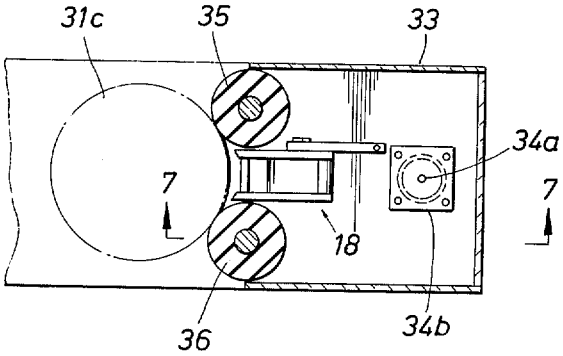
FIG. 5 is a sectional view taken along line 5—5 of FIG. 3.
Figure 7:
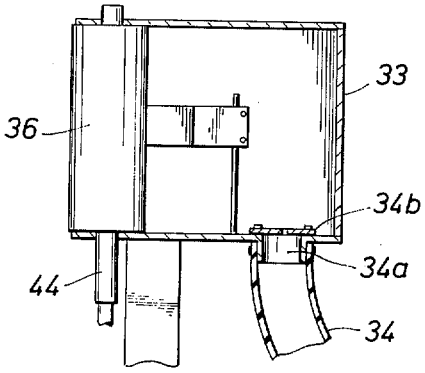
FIG. 7 is a view taken along line 7—7 of FIG. 5.

As shown in FIG. 5, the magnet and magnetic detector head assembly 18 of FIG. 1 is mounted in box 33 that is closed on the top and bottom and on three sides, but is open on the side facing can 31c. Hose 34 is connected to the bottom of the box and is in fluid communication with the box through opening 34a. The hose is connected to a vacuum pump (not shown) to pull air out of the box and reduce the pressure therein. Rollers 35 and 36 are mounted on the box in spaced parallel relationship with part of the rollers inside the box and part extending out through the opening. A very small clearance is provided between the rollers and the side walls of the box, as shown in FIG. 5. The magnet-magnetic detector head assembly is mounted so that it is positioned between the rollers, as shown in FIGS. 5 and 6, so that when can 31c is in engagement with rollers 35 and 36, the side walls of the can will be positioned the desired distance away from arms 15 and 16 of pole pieces 11 and 12.

In accordance with this aspect of the invention, the can is held in engagement with the rollers by a differential pressure created by reducing the pressure in box 33. When the rollers are in engagement with the can, the flow of air into the box will be restricted substantially to the space between the rollers and the side walls of the can and between the rollers and the top and bottom walls of the can. By keeping this space as small as possible and providing an adequate vacuum pump, a sufficient reduction in pressure in the box can be maintained to firmly hold can 31c against the rollers.

Tests using a No. 211 can indicate that a vacuum of 1" Hg will hold the can against the rollers with enough force for rotation of the rollers to be transmitted to the can. A vacuum of 3–5" Hg is preferred. A vacuum above about 10" Hg may damage the can. If the side of the can is dented the seal between the rollers and the can will be broken when the dented portion is in engagement with a roller. If the can is so badly damaged that air will flow into the box too fast for the vacuum pump to obtain the necessary vacuum, then that can will not be pulled against the rollers with sufficient force to be rotated. To keep this from preventing other orienting boxes that may be on the same vacuum system from obtaining the required vacuum, orifice plate 34b is designed to limit the flow of air out of box 33 sufficiently to allow other boxes on the system to obtain the necessary vacuum. In this way, only the orientation of the one damaged can will not be accomplished.

By rotating rollers 35 and 36, means are provided to rotate the can through the magnietic field. In the embodiment shown, electric motor 37 drives vertical shaft 38 by a belt drive that transmits power to the shaft from the output shaft of speed reducer 37a, as shown in FIG. 3. In alignment with shaft 38 is shaft 39. These two shafts are connected through an electric clutch-brake assembly 40. Other means can be used, but one such clutch-brake assembly that has been used satisfactorily is manufactured by Warner Electric. It is called Electro-Pack Clutch/Brake Drive, Size EP–161–25515. With this drive arrangement, shaft 39 will be rotated when the clutch is engaged and will be stopped by the brake when the clutch is disengaged.

Figure 8:
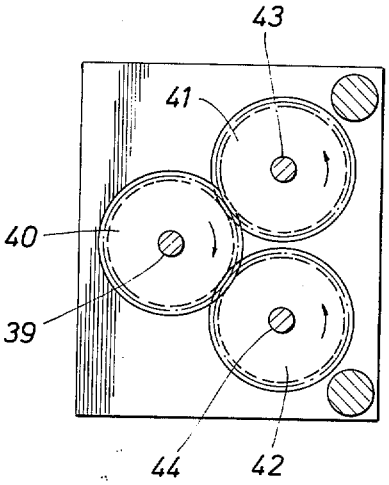
FIG. 8 is a sectional view taekn along line 8—8 of FIG. 3.
Figure 9:
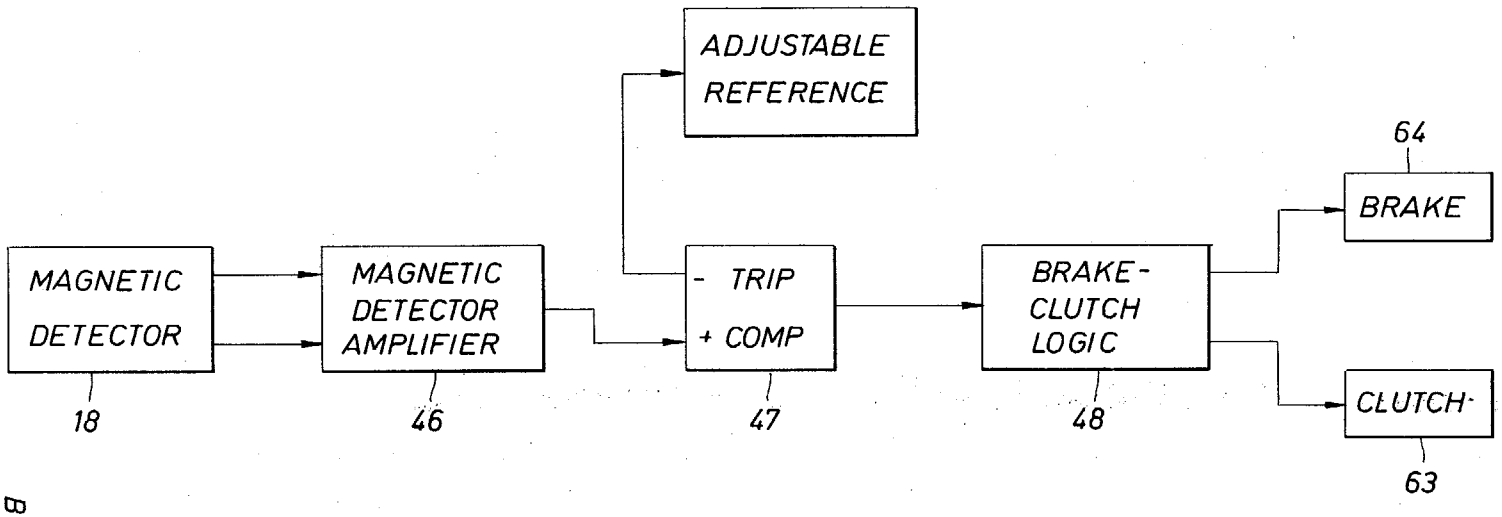
FIG. 9 is a block diagram of the control system actuated by the magnetic detector.

As shown in FIG. 8, shaft 39 drives pinion 40, which in turn drives gears 41 and 42 in the same direction. These gears drive roller mounting shafts 43 and 44, respectively, which in turn rotate rollers 35 and 36 and can 31c, when it is in engagement with the rollers.

Figure 4:
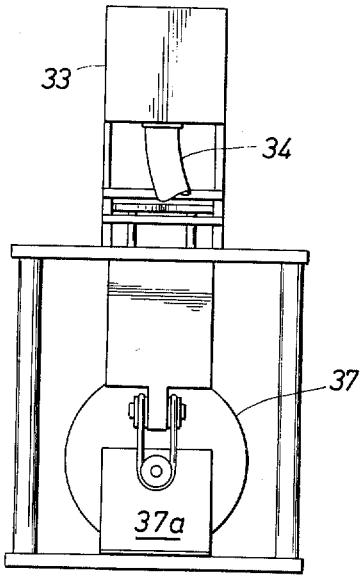
FIG. 4 is a view of the apparatus of FIG. 3 taken along line 4—4.

This entire assembly is mounted on the necessary supporting brackets and frames, as shown in the drawings, and means (not shown) are provided to move the assembly laterally relative to the conveyor belt so as to move rollers 35 and 36 into and out of engagement with the cans as they are moved along the assembly. Also, the moving means will move the orienting apparatus with the can as it moves along the assembly holding the can in engagement with the rollers long enough for the can to be oriented, after which it is moved laterally away from the cans, back to the starting position and back into engagement with the next can coming along the conveyor belt. In orienting the cans in a case, it is contemplated that three such assemblies, as shown in FIGS. 3 and 4, will be arranged in side-by-side relationship to engage the first, third, and fifth cans on one side of the case and orient them to the desired position. Then another group of three such assemblies will engage and orient cans two, four, and six. The same such arrangement will be provided on the other side of the conveyor system so that the cans on each side of the case will be oriented before the cans are placed in their final packaging for shipment.

As explained above, means responsive to the induced current in the magnetic detector head are provided to stop the rotation of the can a predetermined period of time after the current is induced in the head to orient the can in a predetermined position. The can will be rotated by rollers 35 and 36 when the clutch is energized until the clutch is deenergized and the brake is energized. By selecting the proper time delay after the signal is induced, i.e., when the seam passes through the magnetic field of the permanent magnet, the can will be positioned so that the desired portion of the can will face outwardly from the case.

In the embodiment shown, the controls for the clutch-brake assembly is shown in block diagram in FIG. 5. Magnetic detector 18 is connected to amplifier 46 to amplify the signal produced by the movement of the seam through the magnetic field. This amplified signal is transmitted to trip comparator circuit 47 that locates the signal being detected to orient the can. When the signal passes through the reference level which in the embodiment shown is adjustable, the delay timer in the brake-clutch control circuit is triggered, which will stop the can after a predetermined period of time.

Figure 10:
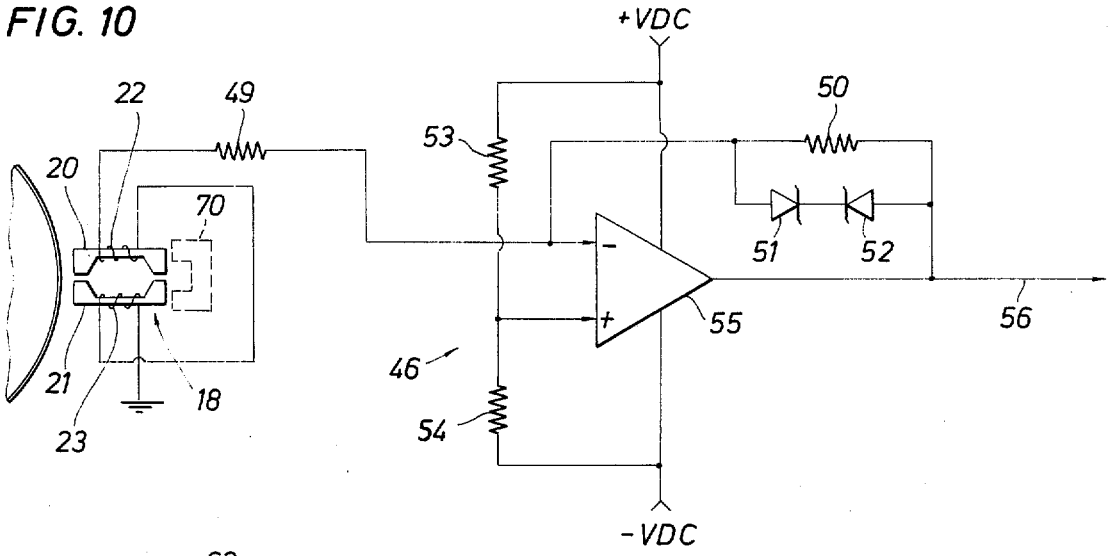
FIG. 10 is a circuit diagram of the magnetic detector amplifier of the control system of FIG. 9.
Figure 11:
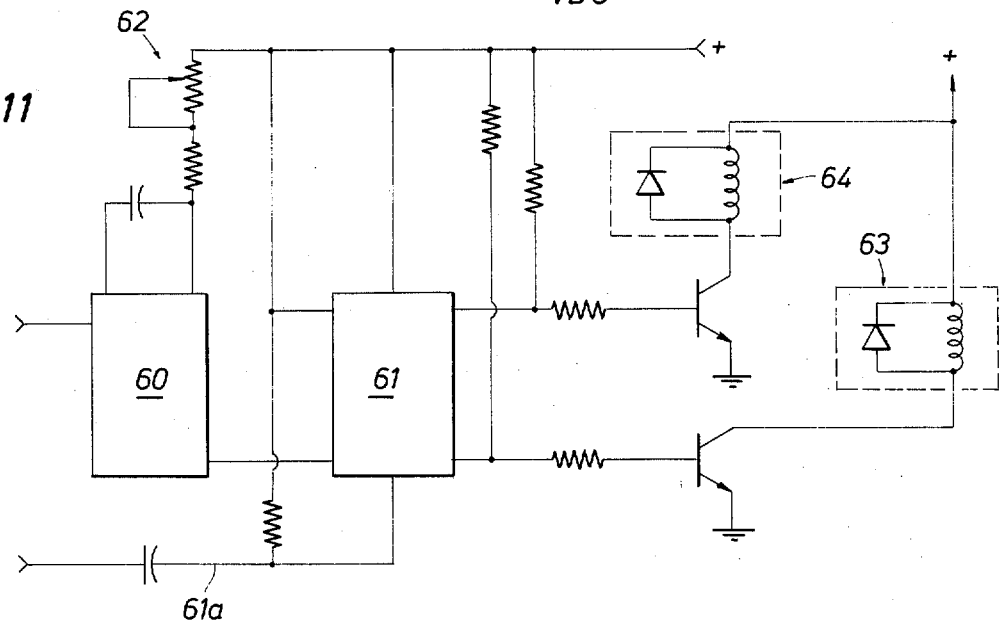
FIG. 11 is a circuit diagram of the brake-clutch control circuit.
Figure 12:
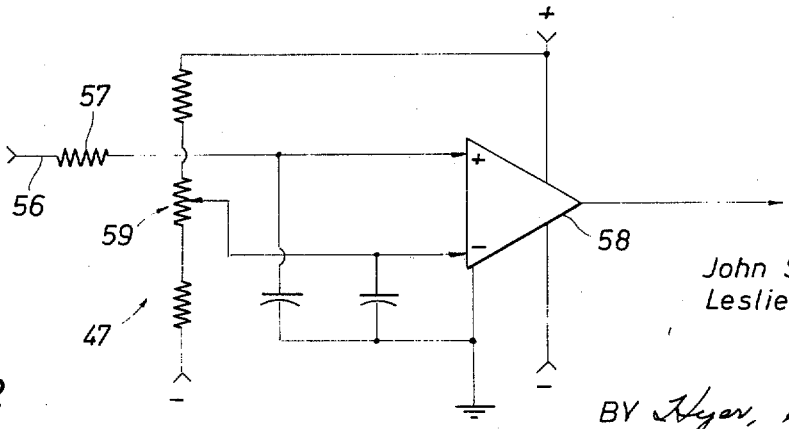
FIG. 12 is a circuit diagram of the trip comparator and an adjustable reference used in the control system of FIG. 9.

Referring now to FIGS. 10, 11, and 12, the specific circuits used in the preferred embodiment of the invention will be described. In FIG. 10, detector head 18 is shown schematically. It includes U-shaped members 20 and 21 of ferro-magnetic material and coils 22 and 23. The coils are connected in series to amplifier 55 through resistor 49. The amplifier is an inverting or feed-back amplifier with a voltage gain set at about 400, preferably by resistor 49 and resistor 50. The output of the amplifier is limited by Zener diodes 51 and 52 connected in parallel with resistor 50. Resistors 53 and 54 maintain a constant voltage bias on the reference input of the amplifier. The output of the amplifier then goes to a voltage that will cause the negative input to go to the same voltage bias by current generated in resistor 50. The amplifier circuit of FIG. 10 is designed to give an adjustable direct current offset at the output without affecting the amplitude of the signal.

The ouput of the magnetic detector amplifier is fed to trip comparator circuit 47 through lead 56 and resistor 57. The trip circuit includes amplifier 58. A negative reference is supplied to amplifier 58 to maintain a positive bias on the output of the amplifier. This reference level is adjustable by varying the setting of potentiometer 59. The positive bias on the amplifier will be set to provide a reference level output for the amplifier that is larger than the extraneous signals that may be generated in the magnetic detector head by minute defects, etc., in the can. The reference level will be low enough, however, for the signal produced, when the seam passes through the magnetic field, to be substantially above the reference level. Thus, the signal produced by the seam will pass through the reference level and be transmitted to brake-clutch circuit 48, as shown in FIG. 11.

The signal from the trip circuit triggers mono-stable multi-vibrator or single-shot 60. Bi-stable or flip-flop 61 is designed to be triggered by the trailing edge of the pulse from single-shot 60. The length of the pulse from single-shot 60 is adjustable by variable resistor 62. In this way, the desired time delay from the production of the signal by the seam until the actuation of the brake is adjustable. When the can is being rotated and the clutch is engaged, bi-stable multi-vibrator 61 will be in the state where clutch circut 63 will be energized. When the trailing edge of the signal from single-shot 60 reaches multi-vibrator 61, it switches to its alternate state, which de-energizes the clutch and energizes brake circuit 64.

After the brake is applied, the vacuum in box 33 is broken, releasing can 31c and allowing the orienting apparatus to be moved laterally away from the can and back into position to orient another can coming along the conveyor belt. Flip-flop 61 is returned to the state where clutch circuit 63 is energized by a signal provided through lead 61a, in any convenient manner, before another can engages the rollers.

In FIG. 10, permanent magnet 70 is shown in dotted lines positioned to induce a current in coils 22 and 23 by causing magnetic flux to flow continuously through members 20 and 21. This is an alternate embodiment of the invention. Here the flux pattern in the air gap between the adjacent surfaces of members 20 and 21 would be disturbed by the passage of the seam of the can, which would cause a change in the current induced in coils 22 and 23. This current change can be used as the signal for actuating the circuitry and energizing brake circuit 64. As stated above, this is an alternate embodiment of the invention and does not usually produce as sharp a signal as does the magnetic head-permanent magnet arrangement described in FIG. 1.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, what is claimed is:

1. Apparatus for orienting a member having a known structural discontinuity that will cause a change in a magnetic field when the discontinuity moves through the field comprising means for providing a magnetic field through which such a member being oriented is moved and means for providing a signal when said magnetic field is changed by a structural discontinuity in the member to allow the member to be oriented in response to said signal.

2. The apparatus of claim 1 in which the means providing a magnetic field include a permanent magnet.

3. The apparatus of claim 1 in which the magnetic field means includes a permanent magnet and two spaced horseshoe pole pieces positioned for the lines of flux between the pole pieces to extend transverse the discontinuity in the member being oriented as the discontinuity moves through the field.

4. The apparatus of claim 3 in which the signal providing means includes a magnetic detector in which a current is induced that is proportional to the strength of the magnetic field in which it is located and which is positioned between the pole pieces and adjacent the member being oriented to have a changing current induced therein by the change in the magnetic field between the pole pieces caused by the movement into the field of the discontinuity in the member being oriented.

5. The apparatus of claim 4 in which the magnetic detector is centrally located relative to the horseshoe pole pieces in an area of reduced flux resulting from the mutual opposition of the magnetic fields traveling on opposite sides of the detector.

6. The apparatus of claim 1 further provided with means to move such a member through the field and means, responsive to the signal producing means, to stop the movement a predetermined period of time after said signal is produced to position the member in the desired orientation.

7. Apparatus for orienting a cylindrical can of ferromagnetic material having a longitudinal seam, comprising apparatus for rotating the can around its longitudinal axis, a magnet, means positioning the magnet adjacent the can for the magnetic field of the magnet to travel through a portion of the can in a circumferential direction transverse the seam, a magnetic detector head positioned adjacent the portion of the can through which the magnetic field travels, said head having a current induced therein when the seam is adjacent the coil by the flux fringing to the outside of the can around the seam, and means responsive to the induced current to stop the rotation of the can a predetermined period of time after the current is induced to orient the can in a predetermined position.

8. The apparatus of claim 7 in which the magnet includes two pole pieces located on opposite sides of the detector and positioned adjacent the can for the magnetic flux between the poles to travel through the can across the seam of the can.

9. The apparatus of claim 7 in which the magnetic detector head includes two spaced members of ferro-magnetic material, each having one end adjacent the can and a conductor coiled therearound in which a current is induced when a portion of the flux fringing around the seam flows through the two spaced members.

10. The apparatus of claim 9 in which each pole piece of the magnet has two spaced arms with the arms positioned to cause two spaced magnetic fields to be established between the pole pieces to provide an area of low flux between the two magnetic fields due to their mutual opposition and in which the magnetic detector is positioned in said area of reduced flux to reduce the amount of flux traveling through the detector head to keep to a minimum unwanted signals generated by variations in spacing between the can and the magnetic detector.

11. The apparatus of claim 10 in which the magnetic detector head further includes a layer of material of high magnetic permeability positioned between the two members and the magnet to tend to shield the members from any portion of the magnetic field of the magnets that may travel directly toward the magnetic detector head and to further reduce the flux traveling through the detector head directly from the magnet.

12. The apparatus of claim 7 in which the can rotating apparatus includes a housing having an opening in one side, two cylindrical rollers mounted in the opening [are] *in* spaced parallel relationship to engage the cylindrical side surface of a can, means for rotating the rollers to rotate the can, and means for reducing the pressure in the housing to cause the ambient external atmospheric pressure to hold a can in engagement with the rollers to be rotated thereby.

13. Apparatus for orienting a cylindrical can of ferromagnetic material having a longitudinal seam comprising can rotating and stopping apparatus including a housing having an opening in one side, two cylindrical rollers mounted in the opening in spaced parallel relationship to engage the cylindrical outer surface of a can, means for rotating the rollers to rotate the can around its longitudinal axis, and means to reduce the atmospheric pressure in the housing to cause the external atmospheric pressure to urge the can againt the rollers, a magnet mounted between the rollers adjacent the cylindrical outer surface of the can to cause the magnetic field of the magnet to pass through a portion of the can wall transverse the longitudinal seam of the can, a magnetic detection head positioned adjacent the portion of the can in which the magnetic field of the magnet is located, to have a current induced therein when the seam of the can passes through the magnetic field, and means responsive to the induced current to stop the rotation of the rollers a predetermined period of time after the current is induced to orient the can in a predetermined position.

14. The apparatus of claim 13 in which the magnet includes two poles pieces located on opposite sides of the detector and positioned adjacent the can for the magnetic flux between the pole pieces to travel through the can transverse the longitudinal seam of the can.

15. The apparatus of claim 13 in which the magnetic detector head includes two spaced members of ferromagnetic material, each having one end adjacent the can and a conductor coiled therearound in which a current is induced when a portion of the flux fringing around the seam flows through the two spaced members.

*16. Apparatus for orienting a generally cylindrically shaped member to a preselected position comprising means for rotating the member on its longitudinal axis including two spaced rollers to engage the member and rotate it on its longitudinal axis, means for reducing the atmospheric pressure on the opposite side of the rollers from the member to cause the member to be held against the rollers by the pressure differential so created, and means for stopping the rollers when the member is in the desired orientation, said means for stopping the rollers including means providing a magnetic field through which the member moves as it is rotated and means sensitive to a change in the field by a known discontinuity in the member to stop the rollers a preselected period of time after said change occurs to position the member in the desired orientation.*

*17. Apparatus for orienting a generally cylindrically shaped member to a preselected position comprising means for rotating the member on its longitudinal axis including two spaced rollers to engage the member and rotate it on its longitudinal axis, means for reducing the atmospheric pressure on the opposite side of the rollers from the member to cause the member to be held against the rollers by the pressure differential so created, means providing a magnetic field through which the member moves as it is rotated and means sensitive to changes in the magnetic field to provide a signal when a known discontinuity in the*

*member passes through the field and means responsive to the signal to stop the rotation of the rollers a preselected period of time after receiving the signal to position the member in the desired orientation.*

References Cited

The following references, cited by the Examiner, are of record in the patented file of this patent or the original patent.

UNITED STATES PATENTS

| | | | |
|---|---|---|---|
| 2,635,194 | 4/1953 | Kellogg et al. | 214—340 X |
| 3,306,473 | 2/1967 | McCoy | 214—1 G |
| 2,222,504 | 11/1940 | Essen | 198—33 AB |
| 2,679,918 | 6/1954 | Vargo et al. | 198—33 AB |
| 3,097,743 | 7/1963 | Scholten et al. | 214—340 X |

ROBERT G. SHERIDAN, Primary Examiner